United States Patent Office 2,708,680
Patented May 17, 1955

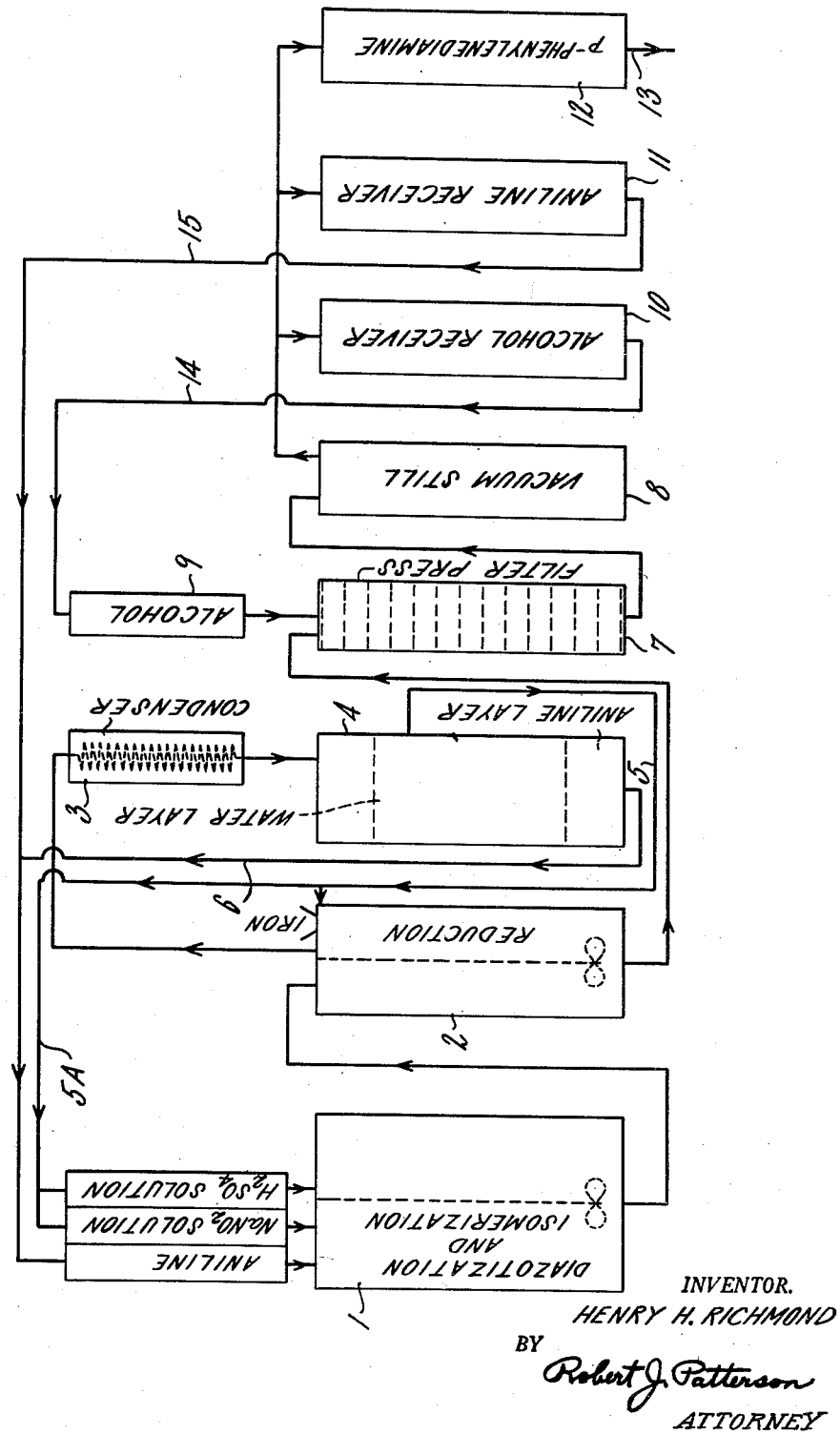

2,708,680
CHEMICAL PROCESS

Henry H. Richmond, Pittsburgh, Pa., assignor to United States Rubber Company, New York, N. Y., a corporation of New Jersey Application July 11, 1949, Serial No. 104,039

2 Claims. (Cl. 260—582)

This invention relates to an improved method of recovering p-phenylenediamine from the reduction mixture which is obtained by the reduction of aminoazobenzene with metallic iron and aqueous mineral acid, which mixture contains p-phenylenediamine and aniline together with water and reduction sludge, composed principally of iron and insoluble conversion products of iron, together with other materials, especially inorganic salts which are soluble in water. The invention relates to a novel simplified and highly expeditious recovery procedure whereby the p-phenylenediamine is isolated from the reduction mixture in a directly marketable form. By means of the method of the present invention the number of operations and the equipment requirements for effecting the recovery are greatly reduced. Furthermore, by the method of the present invention the product p-phenylenediamine is recovered by a distillation step without prior crystallization from an aqueous medium.

p-Phenylenediamine is an important dyestuff for furs and is a valuable intermediate in the manufacture of antioxidants, dyestuffs, and rubber accelerators.

One of the most economical methods for the manufacture of p-phenylenediamine consists of conversion of aniline to diazoaminobenzene, isomerization of the latter to aminoazobenzene and reduction of the latter with iron and aqueous mineral acid. The reactions that take place, where hydrochloric acid is used, may be illustrated as follows:

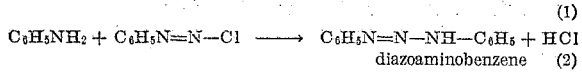

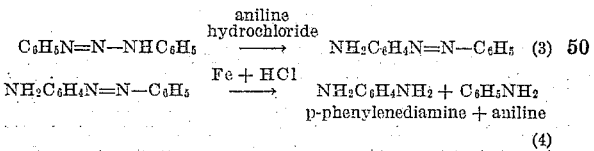

The present invention relates to the recovery of p-phenylenediamine from the reaction mixture produced by the process just described.

The prior art method of recovering p-phenylenediamine from this reduction mixture was as follows: The aniline remaining in the reduction mixture was removed by steam distillation after which the aqueous suspension was filtered to remove the reduction sludge and give an aqueous solution of p-phenylenediamine and the inorganic salts and reaction by-products. This aqueous solution was then concentrated to a point where upon cooling p-phenylenediamine crystallized out and was filtered off. More p-phenylenediamine could be separated from the mother liquor by adding hydrochloric acid to precipitate it as the hydrochloride which was then separated and converted to p-phenylenediamine by a devious method. The p-phenylenediamine which was filtered from the mother liquor was carefully dried and distilled. It was necessary to distill the crystalline material in order to obtain a satisfactory marketable grade of p-phenylenediamine because the lump p-phenylenediamine formed by distillation does not oxidize nearly as readily as p-phenylenediamine in powder form.

Many difficulties attend the recovery process as heretofore practiced. Among these difficulties the following may be mentioned. The steam distillation to remove the aniline is troublesome because it is accompanied by foaming, it is time-consuming and it presents the problem of recovering aniline from a large volume of aqueous solution with inevitable loss of aniline. Filtration of the hot aqueous suspension of sludge is very difficult and slow because of the plugging of the filter cloth. Substantial losses of p-phenylenediamine in the aqueous mother liquor are unavoidable because of the presence of soluble inorganic salts. The drying of the wet p-phenylenediamine is difficult because of air oxidation. The isolation involves an excessive number of stages and requires an excessive capital expenditure for expensive equipment. The concentration of the aqueous solution of p-phenylenediamine is accompanied by oxidation with lowering of yields. The presence of small amounts of moisture, say of the order of 1%, in the dried p-phenylenediamine results in a poor grade of p-phenylenediamine after distillation hence requiring special effort and equipment to dry the p-phenylenediamine completely. All of these difficulties are avoided by the present invention which makes possible the recovery of p-phenylenediamine in high yields and at considerably reduced cost.

I have discovered that p-phenylenediamine in a high state of purity can be recovered from the aforementioned reduction mixture in a highly improved manner by first distilling substantially all of the water from the reduction mixture as an azeotrope with a portion of the aniline present, thereby forming a residual mixture which is substantially or completely free from water and which contains the p-phenylenediamine in solution in the balance of the aniline in admixture with the reduction sludge and inorganic salts present and any insoluble tarry material present, treating this residual mixture, preferably by filtering it, to mechanically separate a substantially anhydrous solution of p-phenylenediamine in aniline from the reduction sludge and the inorganic salts and any insoluble tarry material, and fractionally distilling the separated solution of p-phenylenediamine in aniline and recovering separate fractions of aniline and of p-phenylenediamine.

The present invention may typically be practiced in the following manner. I first distill off all of the water from the reduction mixture together with some of the aniline contained in the reduction mixture which serves as an entrainer for the water. This distillation is preferably effected under vacuum and is greatly facilitated by the fact that the azeotrope of water and aniline contains an extremely high percentage of water (81.8% at atmospheric pressure). The reduction mixture should be nearly neutral at the start of the distillation, this conveniently being effected by addition of any suitable alkaline-reacting material to neutralize the acidity present.

After all of the water has been removed by azeotropic distillation in this manner, the residual mixture is warmed to about 85° C. to insure solution of all of the p-phenylenediamine in the quantity of aniline present. This hot mixture is then filtered through a heated filtering device such as a steam-heated Büchner filter-funnel. The sludge and inorganic salts are coagulated in the non-aqueous medium and are readily separated in the filtration step.

The temperature at which the filtration is conducted is important. If the temperature is too low, not all of the p-phenylenediamine will be removed using the quantity of aniline normally present. It is preferred to carry out the filtration at a temperature of from 50° to 100° C.

It is advisable to insure that sufficient aniline is present at this point to dissolve all of the p-phenylene-diamine present since otherwise a loss of p-phenylenediamine will occur. If desired extraneous aniline may be added for this purpose. However, it is preferable to condense the aniline-water distillate formed in the first distillation step and to allow the separation of the condensate into an upper aqueous layer and a lower aniline layer, to separately withdraw these layers and to combine the separated aniline layer with the distillation residue, either during distillation or subsequently. This not only insures that there is present enough aniline to dissolve all of the p-phenylenediamine but also saves the aniline contained in the aniline layer since it is ultimately recovered in the final distillation step.

It is preferred to wash the filtration residue with a good solvent for p-phenylenediamine such as ethyl alcohol, aniline (preferably warm) or benzene, and to combine the washings with the filtrate in order to save the aniline and p-phenylenediamine contained therein. If the residue is washed with a solvent for aniline, such as ethyl alcohol or benzene, the washed residue will no longer contain aniline and may be discarded. If, however, the residue is washed with aniline, it should be retained for aniline recovery.

The filtrate, obtained after separation from the sludge and inorganic salts, is then fractionally distilled, preferably under vacuum and under an inert atmosphere. This fractional distillation readily separates the aniline and p-phenylenediamine. Where a solvent other than aniline was used for washing and the washings were combined with the filtrate, a separate fraction of such other solvent will also be recovered in the fractional distillation. The quality of the p-phenylenediamine obtained is found to be very good and it is in a marketable condition.

It is preferred to carry out the two distillation steps of my process under reduced pressure in order to minimize decomposition. In many cases reduced pressure is applied in the final fractional distillation step only while the aniline and p-phenylenediamine fractions are being taken over.

Many advantages flow from the practice of the present invention, among which the following may be enumerated. With my process all of the water is removed azeotropically with a small portion of the aniline already present in the reduction mixture, so that no water remains; for this reason a good grade of p-phenylenediamine is obtained on distillation. The distilled product obtained is much more satisfactory than a crystallized product such as was obtained by prior art practice, for the reason that the lump material obtained by distillation has a much smaller surface and therefore is not exposed to air oxidation to anywhere nearly the same extent that a powdered material is exposed. The volume of water involved in the first distillation step of my process is small in comparison with the large volume of water present in the steam distillation of the prior art so that in my process there is no problem of recovering aniline from a large quantity of water. The small quantity of aqueous phase containing aniline, resulting from condensation of the distillate and separation of the water layer, can be used in place of water in subsequent runs in the diazotization and reduction so that no aniline is lost and there is no necessity for recovery of aniline from this water phase. In this way I dispense with considerable equipment such as an aniline boiler and associated equipment including an aniline-water settler, condenser, pumps, etc. The small quantity of aniline which distills with the water in my process is readily separated and may be returned to the distillation vessel, as described above. The aniline phase is substantially anhydrous so that the distillation residue is not thereby contaminated with water.

The residual suspension of reduction sludge, inorganic salts and solution of p-phenylenediamine in aniline obtained after the distillation of the water filters very readily; the sludge and inorganic salts coagulate in this particular organic medium thereby giving a mixture which filters easily and quickly. There are no losses of p-phenylenediamine in an aqueous mother liquor as in the prior art practice. There is no necessity for concentrating an aqueous solution of p-phenylenediamine with resulting loss due to oxidation. Considerable equipment is saved by dispensing with the crystallization of p-phenylenediamine from an aqueous solution thereof; this equipment includes a vacuum evaporator, a holding tank for concentrated liquor, a crystallizer, a centrifuge, a mother liquor holding tank, a vacuum drier and concomitant equipment including pumps, heating and cooling systems, piping, etc.; some of this equipment is exceptionally costly.

Furthermore the process of my invention eliminates the steps of concentrating, filtering of crystalline p-phenylenediamine and drying of p-phenylenediamine. My process saves considerable time and labor and results in a substantial reduction in the cost of manufacture of p-phenylenediamine. In addition, the yield is considerably improved by the use of my process.

It could not have been predicted that the process of my invention would be operative to give the results achieved, for the following reasons:

1. It was unexpected to find that the sludge was readily filtered from the aniline solution.
2. There was no data on the distillation system of aniline-p-phenylenediamine, hence it was unknown whether they could be separated. It might have turned out that they formed constant-boiling mixtures and were therefore inseparable.
3. The decomposition products in the distillation of aniline, p-phenylenediamine and impurities and the by-products formed and present were unknown. The success of the method was dependent on the fact that these impurities were capable of being fractionated from aniline and p-phenylenediamine.
4. The effect of the iron sludge and salts present on the heated aniline and p-phenylenediamine in a non-aqueous medium was unknown. The success of the new process was dependent on the fact that these materials did not cause decomposition or transformation of aniline and p-phenylenediamine.
5. It was unknown if the quantity of tar formed during the fractionation of the p-phenylenediamine would be small enough to make distillation feasible.

The following examples illustrate my invention in more detail.

*Example 1*

To 590 cc. (6.46 moles) aniline and 58.4 cc. (0.70 mole) of concentrated hydrochloric acid there was added a solution of 41.4 g. (0.58 mole) of sodium nitrite in 160 cc. of water over a period of fifteen minutes, keeping the temperature of the reaction mixture at 10–20° C. with cooling. A slurry of yellow diazoaminobenzene appears at this stage. The reaction mixture was then stirred, gradually warming to 40°–50° until the isomerization of the diazoaminobenzene to the aminoazobenzene was complete. This was indicated by the absence of a red boundary zone when a drop of the reaction mixture was placed on a piece of filter paper beside a drop of a 2% solution of alpha-naphthylamine in acetic acid.

To the above mixture there was added 100 g. (1.76 atoms) of iron borings and 200 cc. of water. Reduction was allowed to proceed, stirring first at 60° C. for one hour then at 90° C. until the reduction was complete which was indicated when a drop of the reaction mixture gave a clear colorless ring around a dark spot on filter paper.

The mixture was made alkaline with 10.4 g. of sodium carbonate and vacuum distilled from the same three necked flask in which the various reactions had been carried out, at 20 mm. until no more water appeared in the distillate. There was obtained an aqueous phase of 392 g. and an aniline phase which was returned to the distillation vessel. The aqueous phase was used in place of water in subsequent runs so that aniline present was not lost. The contents remaining was heated to 85° C. and filtered through a steam heated Büchner funnel, the residual sludge being washed with alcohol to remove adhering aniline. The weight of dried sludge was 160.2 g.

The filtrate containing alcohol, aniline and p-phenylenediamine was fractionally distilled to recover the alcohol, aniline and p-phenylenediamine. The weight of aniline recovered by distillation was 487.5 g., B. P. 76–81° C. at 15 mm. The weight of distilled p-phenylenediamine was 46.5 g., B. P. 140–150° C. at 12 mm. which is a yield of 75% based on the sodium nitrite. Total aniline recovery including that in aqueous phase is 500.5 g. which is 96% of the theoretically possible recovery.

Example 2

To 1350 g. (1326 cc., 14.35 moles) of aniline in a 3 l. three neck flask equipped with a stirrer, thermometer and a burette for adding the aqueous sodium nitrite below the surface of the contents in the flask, was added with stirring 140.1 cc. (1.65 moles) of 37% hydrochloric acid. The temperature which rose to 50° C. was cooled to 25° C. by addition of ice chips and maintained there while adding a solution of 105.6 g. of 98% sodium nitrite (1.5 moles) in 125 cc. water over twenty minutes. About half way through the addition a crystalline precipitate of diazoaminobenzene appeared. The whole was stirred one hour after addition of nitrite and then 113.9 cc. (1.35 moles) of 37% hydrochloric acid was added over five minutes. The temperature rose to 40° C. and dropped to 38° C. after stirring for four hours, the flask being insulated with cotton wool. The isomerization to aminoazobenzene was then complete.

Reduction was effected by adding 48 g. of sodium hydroxide pellets and 240 g. of iron turnings, the temperature rising to 58–60° C. and remaining there for two hours. The contents were then warmed to 95–100° C. for two hours to complete the reduction.

Excess acid was neutralized by addition of 12 g. (0.33 mole) of sodium hydroxide to the reduction mixture and the water was removed by distillation at 25 mm. The distillate consisted of 900 cc. water and a bottom layer of 99 cc. aniline. The residue was warmed to 85° C. and filtered and the filter cake washed with two 150 cc. portions of warm aniline. The aniline was flash distilled from the filtrate and washings at 45 mm., and the residue distilled at 167–9° C. and 25 mm. to give 132.6 g. of p-phenylenediamine M. P. 136–8° C. which is a yield of 82% based on sodium nitrite. Volume of aniline distillate was 1183 cc. Weight of tar still residue was 19 g.

The iron oxide filter cake and the 900 cc. water layer were steam distilled to give 152 cc. aniline and an aqueous top layer of 915 cc. Total recovery of wet aniline is 152+1182+99=1434 cc. Amount of aniline used =1326+300=1626 cc. Aniline consumed in the reaction is then 192 cc. some of which is dissolved in the 915 cc. aqueous layer from the steam distillation and can be reused.

In the accompanying drawing, aniline is converted to diazoaminobenzene and the latter is converted to aminoazobenzene in unit 1 to which aniline, sodium nitrite aqueous solution and aqueous mineral acid are supplied as shown. The reaction mixture is then fed to unit 2 where the aminoazobenzene is reduced to p-phenylenediamine in the presence of metallic iron and aqueous mineral acid. After reduction, the reduction vessel 2 may be used as still and the water-aniline azeotrope distilled off. The distillate may be condensed in condenser 3, the condensate being allowed to separate in vessel 4 into an upper water layer which may be returned via line 5 to the reduction vessel 2 and a lower aniline layer which may be recycled via line 6 to reactor 1. If desired, a portion of the water layer may be fed via line 5A for making up the sodium nitrite and sulfuric acid solutions charged to reactor 1.

The distillation residue left in vessel 2 may then be filtered in filter press 7, the filtrate being passed to vacuum still 8. If desired, the filtration residue may be washed by means of alcohol, or other solvent for aniline and p-phenylenediamine, added from a supply 9.

The anhydrous filtrate, together with washings if the filtration residue was washed with a solvent, is fractionated in still 8 into a fraction of solvent, where a solvent other than aniline was employed to wash the filtration residue, this solvent fraction being collected in receiver 10, a fraction of aniline collected in receiver 11 and a fraction of the desired product p-phenylenediamine collected in receiver 12 from which it may be withdrawn via line 13. The solvent fraction collected in receiver 10 may be recycled via line 14 to supply 9 and the aniline fraction collected in receiver 11 may be recycled via line 15 to reactor 1. A residual fraction, composed mainly of tarry material may be left in still 8, whence it may be removed as desired in any suitable manner and discarded.

Having thus described my invention, what I claim and desire to protect by Letters Patent is:

1. A method of recovering p-phenylenediamine from the reduction mixture resulting from the reduction of aminoazobenzene with iron and mineral acid, said mixture comprising p-phenylenediamine and aniline in admixture with water, reaction by-products, reduction sludge and inorganic salts, the amount of said aniline being more than sufficient to form an azeotrope with all of said water and being sufficient to dissolve all of said p-phenylenediamine in the absence of water, which comprises neutralizing said mixture, distilling from the neutralized mixture substantially all of the water contained therein as an azeotrope with a portion of the aniline contained therein and thereby forming a substantially anhydrous residual mixture containing aniline in amount sufficient to dissolve substantially all of the p-phenylenediamine present and coagulating said sludge and inorganic salts, treating said residual mixture to mechanically separate a substantially anhydrous solution of the p-phenylenediamine in aniline from said reduction sludge and inorganic salts, and fractionally distilling the resulting solution of p-phenylenediamine in aniline and distilling over and recovering separate fractions of aniline and of substantially pure p-phenylenediamine while leaving impurities and by-products as a residue.

2. A method of recovering p-phenylenediamine from the reduction mixture resulting from the reduction of aminoazobenzene with iron and mineral acid, said mixture comprising p-phenylenediamine and aniline in admixture with water, reaction by-products, reduction sludge and inorganic salts, the amount of said aniline being more than sufficient to form an azeotrope with all of said water and being sufficient to dissolve all of said p-phenylenediamine in the absence of water, which comprises neutralizing said mixture, distilling under vacuum from the neutralized mixture substantially all of the water contained therein as an azeotrope with a portion of the aniline contained therein and forming a substantially anhydrous residual mixture containing aniline and p-phenylenediamine and containing the sludge and inorganic salts in coagulated form, condensing the aniline-water distillate, allowing the condensate to separate into a water layer and an aniline layer, separately withdrawing said aniline layer and combining it with the distillation residue, filtering the mixture thus obtained while maintaining it at a temperature of from 50° C. to 100° C. and thereby separating a substantially anhydrous solution of p-phenylenediamine in aniline as a filtrate from said reduction sludge and inorganic salts, and fractionally distilling the resulting solution of p-phenylenediamine in aniline under vacuum and distilling over and recovering separate fractions of aniline and of substantially pure p-phenylenediamine while leaving impurities and by-products as a residue.

References Cited in the file of this patent

UNITED STATES PATENTS

| | | |
|---|---|---|
| 1,918,997 | Weiland | July 18, 1933 |
| 2,187,820 | Lecher et al. | Jan. 23, 1940 |

OTHER REFERENCES

Analytical Chemistry, vol. 19 (1947), p. 510, #147.